(12) United States Patent
Mater, Jr.

(10) Patent No.: US 9,452,640 B2
(45) Date of Patent: Sep. 27, 2016

(54) AXLE ALIGNMENT SYSTEM FOR MULTI-AXLE TRAILERS

(71) Applicant: BBS Development, LLC, Frankfort, IL (US)

(72) Inventor: Robert F. Mater, Jr., Elkhart, IN (US)

(73) Assignee: BBS DEVELOPMENT LLC, Frankfort, IL (US)

( * ) Notice: Subject to any disclaimer, the term of this patent is extended or adjusted under 35 U.S.C. 154(b) by 0 days.

(21) Appl. No.: 14/669,450

(22) Filed: Mar. 26, 2015

(65) Prior Publication Data
US 2015/0273941 A1    Oct. 1, 2015

Related U.S. Application Data

(60) Provisional application No. 61/970,388, filed on Mar. 26, 2014.

(51) Int. Cl.
*B60B 35/00* (2006.01)
*B60G 11/10* (2006.01)

(52) U.S. Cl.
CPC ............ *B60B 35/007* (2013.01); *B60G 11/10* (2013.01); *B60G 2202/11* (2013.01); *B60G 2204/121* (2013.01); *B60G 2204/43* (2013.01); *B60G 2204/4402* (2013.01); *B60G 2204/61* (2013.01); *B60G 2300/0262* (2013.01); *B60G 2300/042* (2013.01); *B60Y 2200/147* (2013.01); *Y10T 29/49716* (2015.01)

(58) Field of Classification Search
CPC . B60B 35/007; B60G 11/10; B60G 2202/11; B60G 2204/121; B60G 2204/43; B60G 2204/4402; B60G 2204/61; B60G 2300/0262; B60G 2300/042; Y10T 29/49716; B60Y 2200/147
See application file for complete search history.

(56) References Cited

U.S. PATENT DOCUMENTS

| 3,510,149 A | 5/1970 | Raidel | |
|---|---|---|---|
| 3,982,446 A * | 9/1976 | Van Dyken | B62K 23/02 188/77 R |
| 4,267,896 A * | 5/1981 | Hendriksen | B60G 9/003 267/66 |
| 4,412,690 A | 11/1983 | Prokop et al. | |
| 4,718,691 A | 1/1988 | Specktor et al. | |
| 4,846,495 A | 7/1989 | Laidely | |
| 4,869,527 A * | 9/1989 | Coddens | B60G 7/02 280/86.753 |
| 4,919,404 A | 4/1990 | Santini | |
| 4,998,749 A | 3/1991 | Bockewitz | |
| 5,002,305 A | 3/1991 | Raidel | |
| 5,007,660 A | 4/1991 | Orndorff et al. | |

(Continued)

OTHER PUBLICATIONS

USPTO Office Action, U.S. Appl. No. 12/717,606, dated Aug. 17, 2012.

(Continued)

*Primary Examiner* — Drew Brown
(74) *Attorney, Agent, or Firm* — King & Schickli, PLLC

(57) ABSTRACT

An axle alignment system for a multi-axle trailer includes a mounting bracket, a mounting pin, at least one original equipment spacer, and at least one adjustable spacer. When the mounting bracket is utilized with the mounting pin and the original equipment spacer, the axle alignment system will only exclusively assume a nonadjustable, standard configuration. In contrast, when the mounting bracket is utilized with the mounting pin and the adjustable spacer, the axle alignment system will be activated and assume one of multiple possible adjusted configurations allowing one to align an axle of a multi-axle trailer.

20 Claims, 4 Drawing Sheets

(56) References Cited

U.S. PATENT DOCUMENTS

| | | |
|---|---|---|
| 5,016,906 A | 5/1991 | Cadden |
| 5,037,126 A | 8/1991 | Gottschalk et al. |
| 5,052,711 A | 10/1991 | Pirkey et al. |
| 5,599,038 A | 2/1997 | German |
| 5,647,606 A | 7/1997 | Jordan |
| 5,683,098 A | 11/1997 | VanDenberg |
| 6,027,129 A | 2/2000 | Kleinschmit et al. |
| 6,220,580 B1 | 4/2001 | Balczun |
| 6,409,189 B1 * | 6/2002 | Orimoto .................. B60G 7/02 280/86.751 |
| 6,527,287 B2 | 3/2003 | Hedenberg |
| 6,659,479 B1 | 12/2003 | Raidel, II et al. |
| 6,698,775 B2 | 3/2004 | Ness |
| 6,966,612 B2 | 11/2005 | Philpott |
| 7,213,825 B2 | 5/2007 | Hitt et al. |
| 7,296,809 B2 | 11/2007 | Zebolsky |
| 7,331,588 B2 * | 2/2008 | Johnson .................. B60G 9/00 280/124.116 |
| 7,415,771 B2 | 8/2008 | Harrill |
| 7,467,473 B2 | 12/2008 | Harrill et al. |
| 7,513,517 B2 | 4/2009 | Barton et al. |
| 7,537,226 B1 | 5/2009 | Collazo |
| 7,673,891 B2 | 3/2010 | Johns |
| 7,891,679 B2 * | 2/2011 | Svartz .................... B60G 7/006 280/124.175 |
| 8,567,772 B2 * | 10/2013 | McCarthy .............. B60G 11/12 267/265 |
| 8,590,912 B2 * | 11/2013 | McCarthy .............. B60G 11/10 280/124.163 |
| 8,944,447 B2 * | 2/2015 | Khoury ................. B60B 35/004 280/86.75 |
| 2003/0132593 A1 * | 7/2003 | Ross ....................... B60G 7/02 280/124.1 |
| 2005/0023790 A1 | 2/2005 | Galazin |
| 2005/0156398 A1 | 7/2005 | Ramsey |
| 2006/0249923 A1 | 11/2006 | Ramsey |
| 2007/0052195 A1 | 3/2007 | Collazo |
| 2010/0219677 A1 | 9/2010 | Borgi |
| 2011/0068524 A1 | 3/2011 | McCarthy et al. |
| 2011/0095501 A1 | 4/2011 | Piehl et al. |
| 2011/0175313 A1 | 7/2011 | Pierce et al. |
| 2012/0153589 A1 | 6/2012 | McCarthy et al. |

OTHER PUBLICATIONS

USPTO Office Action, U.S. Appl. No. 12/717,606, dated Apr. 8, 2013.

USPTO Office Action, U.S. Appl. No. 12/971,901, dated Jun. 3, 2013.

USPTO Office Action, U.S. Appl. No. 12/971,901, dated Jan. 23, 2013.

USPTO Office Action, U.S. Appl. No. 12/971,901, dated Jul. 25, 2012.

USPTO Office Action, U.S. Appl. No. 14/036,127 dated Jul. 18, 2014.

USPTO Office Action, U.S. Appl. No. 14/036,127, dated Jan. 30, 2014.

* cited by examiner ively common. As a result of a
AXLE ALIGNMENT SYSTEM FOR MULTI-AXLE TRAILERS This application claims priority to U.S. Provisional Patent Application Ser. No. 61/970,388 filed Mar. 26, 2014, the full disclosure of which is incorporated herein by reference.

TECHNICAL FIELD

This document relates generally to the trailer equipment field and, more particularly, to an axle alignment system for multi-axle trailers.

BACKGROUND

Multi-axle trailers are relatively common. As a result of a permanent unbalanced weight distribution on the trailer or other circumstances, the axles of the trailer may become partially misaligned. This document relates to an axle alignment system that may be activated and utilized to correctly align those axles. By eliminating misalignment between axles, the service life of trailer tires is increased. More specifically, the tread on the tires wears evenly, the tires run cooler and the risk of blowouts is reduced. In addition, towing resistance is reduced thereby increasing the fuel economy of the towing vehicle.

SUMMARY

In accordance with the purposes and benefits described herein, an axle alignment system is provided for a multi-axle trailer. That axle alignment system comprises a mounting bracket, a mounting pin extending through the mounting bracket and two original equipment spacers for receiving and holding the mounting pin exclusively in a home position. In addition, the axle alignment system includes two adjustable spacers that replace the two original equipment spacers and allow adjustment of the mounting pin between at least two positions whereby the axle alignment system provides (a) a nonadjustable, standard configuration with the mounting pin and the two original equipment spacers and (b) an activated, adjustable configuration with the mounting pin and the two adjustable spacers allowing one to align an axle on the multi-axle trailer.

The two original equipment spacers have a first identical shape while the two adjustable spacers have a second identical shape wherein the first shape differs from the second shape. In one possible embodiment, the first shape has four sides and the second shape has more than four sides. In accordance with an additional aspect, the mounting pin is a bolt and cooperating nut. Further, each of the two adjustable spacers includes an eccentric aperture: that is an aperture that is provided off center in the spacer.

In one possible embodiment, the mounting bracket is substantially U-shaped and includes a base section, a first lug and a second lug. The first lug includes a first elongated opening having a first longitudinal axis extending across a first channel of the first lug while the second lug includes a second elongated opening having a second longitudinal axis extending across a second channel of the second lug.

The mounting pin extends through the first elongated opening, the second elongated opening and aligned apertures in each of the original equipment spacers when the axle alignment system is in the nonadjustable, standard configuration. In contrast, the mounting pin extends through the first elongated opening, the second elongated opening and aligned eccentric apertures in the two adjustable spacers when the axle alignment system is in the activated, adjustable configuration.

In accordance to an additional aspect, a method is provided for adjusting the alignment of an axle of a multi-axle trailer with an axle alignment system including a mounting bracket, a mounting pin, at least one original equipment spacer and at least one adjustable spacer. That method may be broadly described as comprising the step of replacing the at least one original equipment spacer that exclusively allows the axle alignment system to assume a nonadjustable, standard configuration, with the at least one adjustable spacer that activates the axle alignment system and allows adjustment of the alignment of the axle of the multi-trailer. In one possible embodiment, that method further includes the step of securing the mounting bracket to frame of the multi-axle trailer.

In the following description, there are shown and described several preferred embodiments of the axle alignment system. As it should be realized, the axle alignment system is capable of other, different embodiments and its several details are capable of modification in various, obvious aspects all without departing from the axle alignment system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the axle alignment system and together with the description serve to explain certain principles thereof. In the drawing figures.

Reference will now be made in detail to the present preferred embodiments of the axle alignment system, examples of which are illustrated in the accompanying drawing figures.

DETAILED DESCRIPTION

Figure 1:
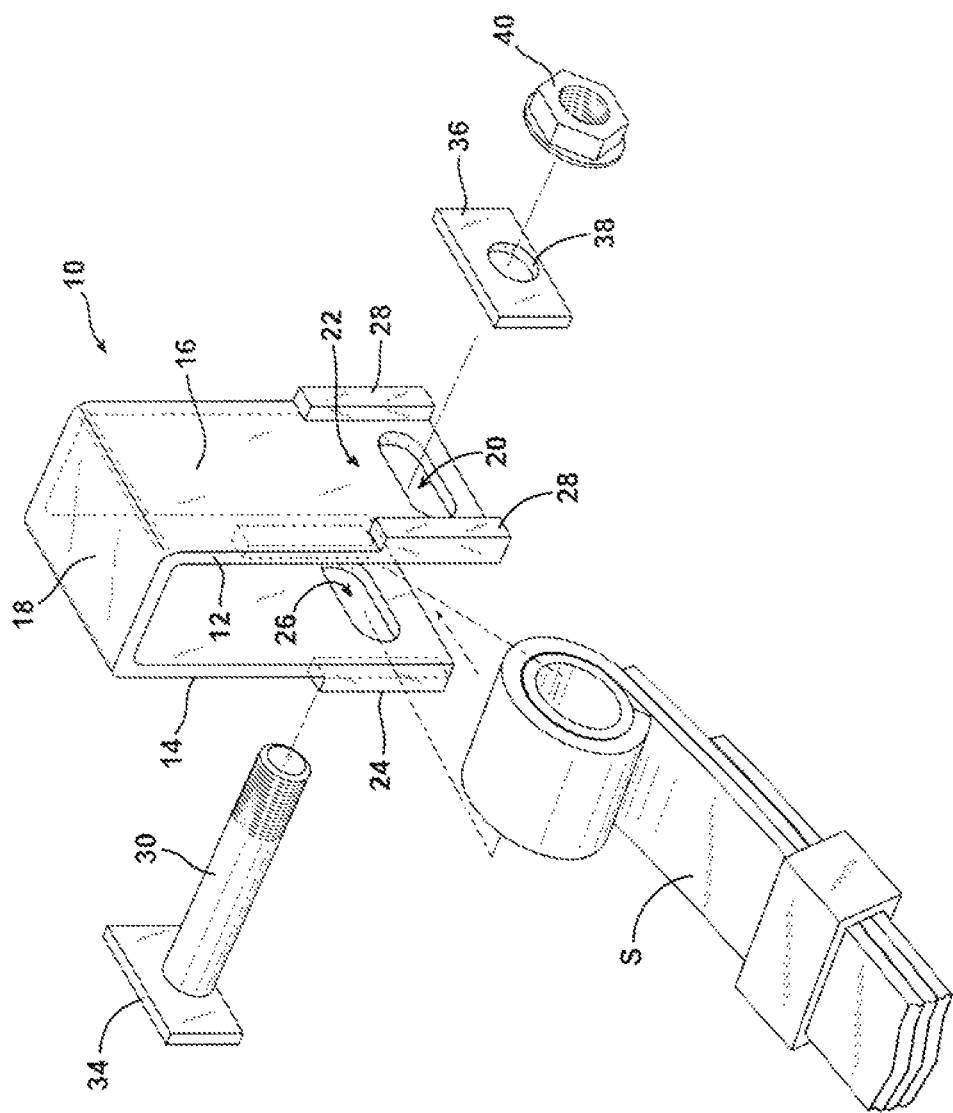
FIG. 1 is a perspective view of a first embodiment of the axle alignment system illustrating a mounting bracket, a first mounting pin and an original equipment spacer.

Reference is now made to FIG. 1 illustrating a first embodiment of the axle alignment system 10 for a multi-axle trailer. That system 10 may be broadly described as including a mounting bracket 12 having a first lug 14, a second lug 16 and a base section 18 connecting the first and second lugs. As further illustrated, the first lug 14 has a first elongated opening 20 and a first channel 22 defined between two blocks 24 defining the sidewalls of the channel.

Figure 3:
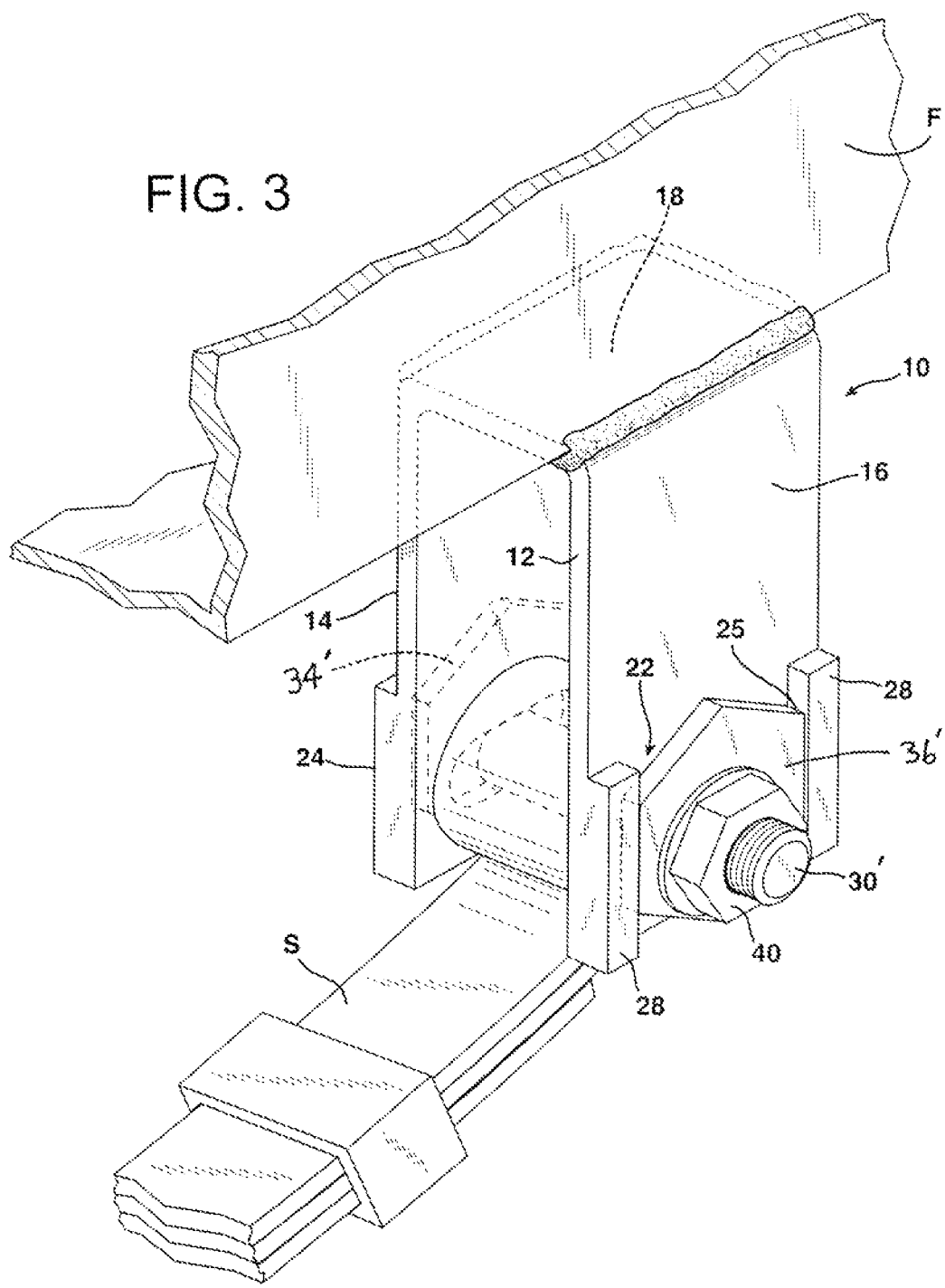
FIG. 3 is a perspective view illustrating the system of FIG. 2 welded to the trailer frame and holding a leaf spring.

Similarly, the second lug 16 includes a second elongated opening 26 aligned with the first elongated opening 20, and a second channel 25 (not shown in FIG. 1) defined between two mounting blocks 28 (see FIG. 3). A first mounting pin 30, in the form of a bolt and cooperating nut, extends through the elongated openings 20, 26. As illustrated, the mounting pin 30 includes a head 34 having a first, four-sided or rectangular shape. In addition, the alignment system 10 includes an original equipment spacer 36 in the form of a four-sided, rectangular plate corresponding in shape to the head 34. The spacer 36 includes a central aperture 38 for engaging the mounting pin at the nut receiving end.

In use, the mounting bracket 12 is fixed, welded or otherwise secured to the frame of the trailer with the mounting pin 30 and cooperating nut 40 utilized to secure the end of the leaf spring S in a manner known in the art. When the axle alignment system 10 incorporates and uses the first mounting pin 30 in combination with the original equipment spacer 36, the axle alignment system provides a nonadjustable, standard configuration. This configuration allows no relative adjustment of the axle with respect to the trailer frame and the other axles of the trailer.

Figure 2:
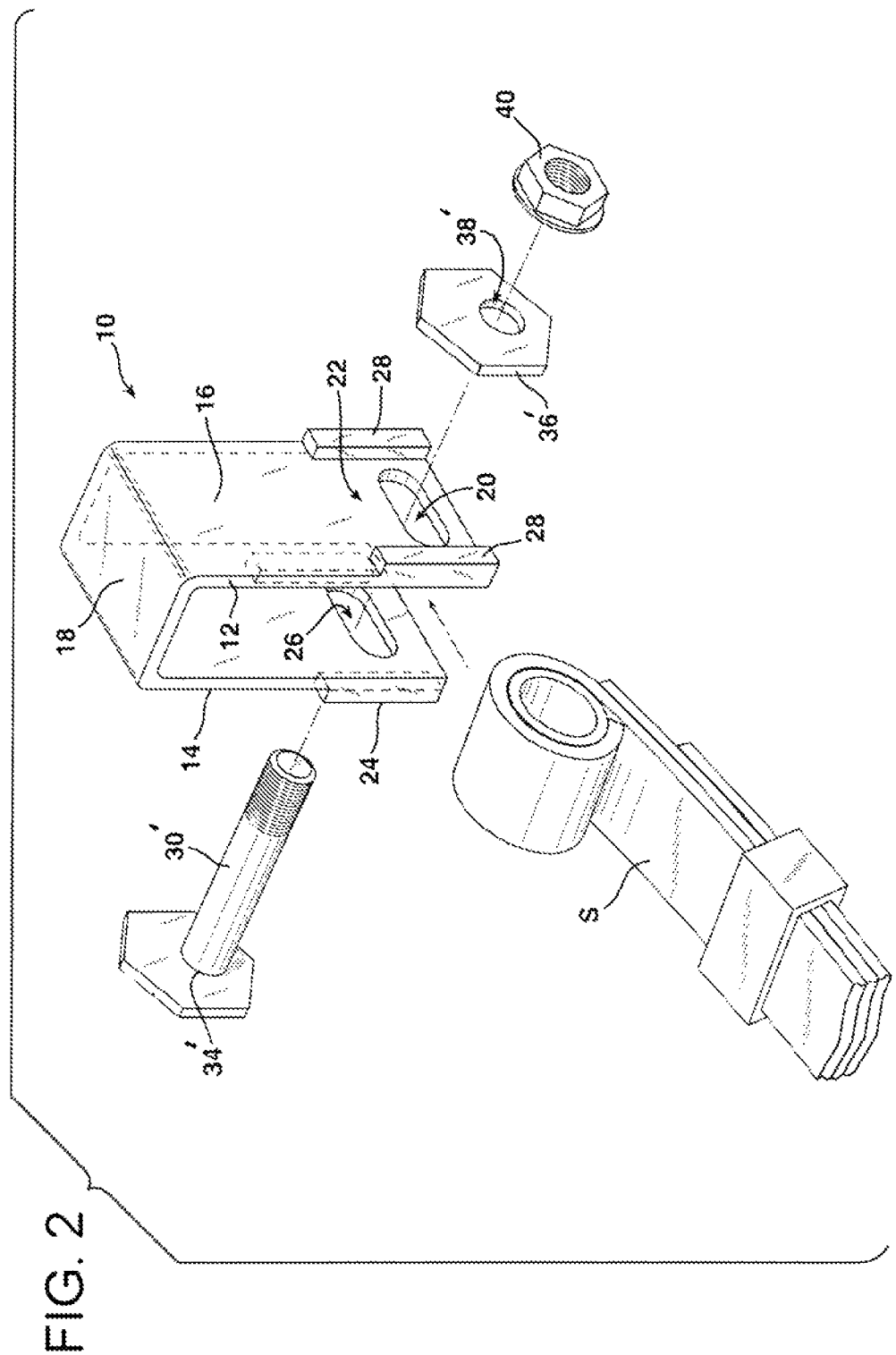
FIG. 2 is a view similar to FIG. 1 illustrating the axle alignment system wherein the two original equipment spacers have been replaced with two adjustable spacers.

Reference is now made to FIGS. 2 and 3 illustrating the axle alignment system 10 wherein a second mounting pin 30' replaces the first mounting pin 30 and an adjustable spacer 36' replaces the original equipment spacer 36. Together, the second mounting pin 30' and adjustable spacer 36' provide the axle alignment system 10 with an activated, adjustable configuration which allows one to align an axle on the multi-axle trailer. As should be appreciated, the head 34' of the second mounting pin 30' has a second multi-sided shape of more than four sides corresponding to the multi-sided shape of the adjustable spacer 36'. Further, the second mounting pin 30' is eccentric: that is the pin projects off-center from the head 34'. Similarly, the adjustable spacer 36' includes an eccentric aperture 38': that is an aperture that is off-center in the spacer. The eccentricity of the pin 30' and the spacer 36' match.

As illustrated in FIG. 3, the adjustable axle alignment system 10 is mounted to the frame F of a trailer T by welding or otherwise securing the base section 18 of the bracket 12 to the frame. The mounting point for the leaf spring S of the trailer axle (not shown) is then adjustable depending upon the orientation of the pin head 34' and spacer 36'. More specifically, the first channel 22 has a width between the side walls defined by the blocks 24 that substantially corresponds to the width of the pin head 34' but includes the necessary clearance to allow the pin head to be received in channel 22. By rotating or manipulating the eccentric pin 30', the position of the mounting pin 30' in the aligned elongated slots 20, 26 may be adjusted forward or rearward as desired to properly align the axles of the trailer in accordance with a method that will be described in great detail below. The elongated openings 20, 26 may, for example, allow up to 1.5 inches of fore/aft adjustment. When properly seated, the opposing side walls of the pin head 34' engage the side walls of the channel 22 defined by the blocks 24.

After inserting the pin 30' through the slot 20, the end of the leaf spring S and the slot 26, the adjustable spacer 36' is positioned in the second channel on the second lug 16. The spacer 36' is oriented so that the end of the mounting pin 30' is received through the aperture 38' and the second spacer 36' is seated fully in the second channel with the side walls of the spacer abutting the side walls of the channel 25 formed by the blocks 28. The nut 40 is then secured on the end of the mounting pin 30' to complete the connection. At this point it should be appreciated that the pin head 34' and spacer 36' are securely held in the channels 22, 25 and, therefore, in turn, the mounting pin 30' is secured in position in the elongated slots 20, 26 at the desired position to provide proper axle alignment.

Figure 4:
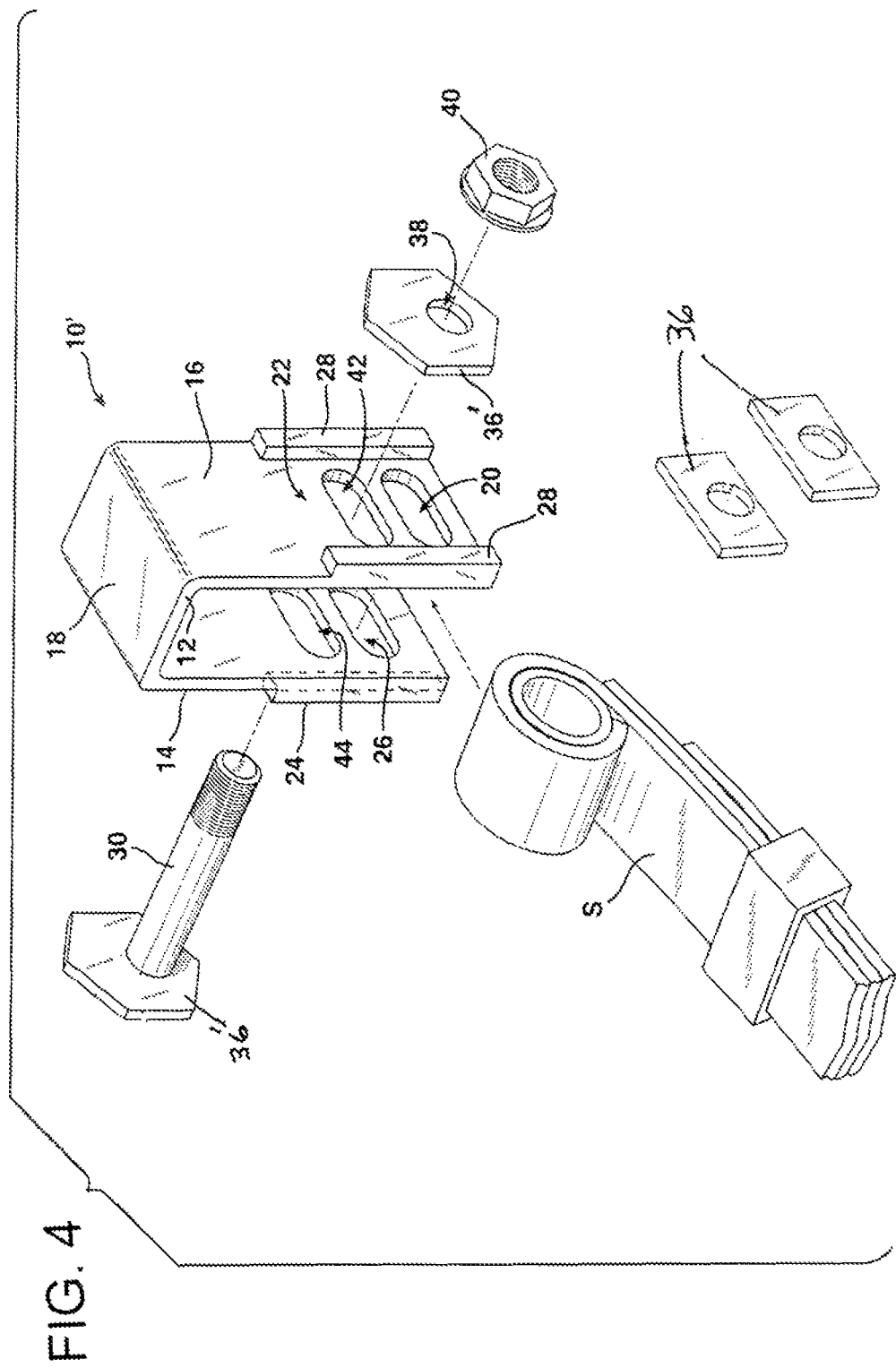
FIG. 4 is a view similar to FIG. 2 but showing an alternative embodiment.

An alternative embodiment of the axle alignment system 10' is illustrated in FIG. 4. Like components in the mounting assembly 10' are provided with the same reference numbers used for the mounting assembly 10 illustrated in FIGS. 1-3.

The differences between the two embodiments 10, 10' will now be described. Specifically, in the second embodiment 10', the mounting pin 30 is a standard bolt 32 and cooperating nut 40. Further, the axle alignment system 10' includes two original equipment spacers 36 and two adjustable spacers 36'. In the illustrated embodiment, the adjustable spacers 36' have replaced the original equipment spacers 36 and the system 10 is activated for adjusting axle alignment.

As further illustrated, the first lug 14 includes a third elongated opening 42 and the second lug 16 includes a fourth elongated opening 44. The third and fourth elongated openings 42, 44 are aligned. The blocks 24 and 28 are longer so as to form longer channels 22, 25. Thus, channel 22 holds both elongated openings 20, 42 while channel 25 holds both elongated openings 26, 44. The second embodiment 10' illustrated in FIG. 4 provides still greater adjustability as the mounting pin 30 may be positioned/received in either set of openings 20, 26 or 42, 44 and then positioned by the adjustable spacers 36' at different points along those sets of openings.

As should be appreciated, the axle alignment systems 10, 10' facilitate a method of adjusting alignment of an axle of a multi-axle trailer. That method may be broadly described as replacing at least one original equipment spacer 36 that exclusively allows the axle alignment system to assume a single, nonadjustable, standard configuration, with at least one adjustable spacer 36' that actuates the axle alignment system and allows adjustment of the alignment of an axle of the multi-axle trailer. The method may also include securing the mounting bracket 12 to the frame F of the trailer T.

Further details of the method of using the axle alignment system 10 or 10' to align an axle are known in the art and are described in detail in U.S. Pat. No. 8,567,772, the full disclosure of which is incorporated herein by reference.

In summary, the axle alignment system 10 provides a number of benefits and advantages. When the mounting bracket 12 is used in conjunction with the first mounting pin 30 and the original equipment spacer 36, the axle alignment system is only capable of assuming a nonadjustable, standard configuration of the type that may be provided by the original equipment manufacturer. If the customer/purchaser desires the optional activation of the axle alignment system, the first mounting pin 30 is replaced with the second mounting pin 30' and the original equipment spacer 36 is replaced with the adjustable spacer 36'. Whereas the first mounting pin 30 and original equipment spacer 36 are non-eccentric, the second mounting pin 30' and adjustable spacer 36' are eccentric thereby providing the axle alignment system with an activated, adjustable configuration allowing adjustment between multiple positions for aligning a trailer axle of a multi-axle trailer.

The foregoing has been presented for purposes of illustration and description. It is not intended to be exhaustive or to limit the embodiments to the precise form disclosed. Obvious modifications and variations are possible in light of the above teachings. For example, the first mounting pin 30' and the second mounting pin 30' may actually both comprise a single eccentric pin that is held in a neutral, nonadjustable position by an original equipment spacer 36 but that may be adjusted between at least two different positions when used with an adjustable spacer 36'. The adjustable spacers 36' may include 6, 8, 10 or even 12 sides to respectively provide 3, 4, 5 or even 6 different adjustment positions. All such modifications and variations are within the scope of the appended claims when interpreted in accordance with the breadth to which they are fairly, legally and equitably entitled.

What is claimed:

1. An axle alignment system for a multi-axle trailer, comprising:
a mounting bracket;
a mounting pin extending through said mounting bracket;
two original equipment spacers receiving and holding said first mounting pin exclusively in a home position;
two adjustable spacers that replace said two original equipment spacers and allow adjustment of said mounting pin between at least two positions whereby said axle alignment system provides (a) a nonadjustable, standard configuration with said two original equipment spacers and (b) an activated, adjustable configuration with said two adjustable spacers allowing one to align an axle on said multi-axle trailer.

2. The axle alignment system of claim 1, wherein said two original equipment spacers have a first identical shape and said two adjustable spacers have a second identical shape wherein said first shape differs from said second shape.

3. The axle alignment system of claim 2, wherein said first shape has four sides and said second shape has more than four sides.

4. The axle alignment system of claim 3, wherein said each adjustable spacer of said two adjustable spacers includes an eccentric aperture.

5. The axle alignment system of claim 4, wherein said mounting bracket is substantially U-shaped including a base section, a first lug and a second lug.

6. The axle alignment system of claim 5, wherein (a) said first lug includes a first elongated opening having a first longitudinal axis extending across a first channel of said first lug and (b) said second lug includes a second elongated opening having a second longitudinal axis extending across a second channel of said second lug.

7. The axle alignment system of claim 6 wherein said mounting pin extends through said first elongated opening, said second elongated opening and an aperture in each original equipment spacer of said two original equipment spacers when said axle alignment system is in said nonadjustable, standard configuration.

8. The axle alignment system of claim 6 wherein said mounting pin extends through said first elongated opening, said second elongated opening and said eccentric aperture in each adjustable spacer of said two adjustable spacers when said axle alignment system is in said activated, adjustable configuration.

9. The axle alignment system of claim 3, wherein said mounting pin comprises a bolt and cooperating nut.

10. The axle alignment system of claim 9, wherein said mounting bracket is substantially U-shaped including a base section, a first lug and a second lug.

11. The axle alignment system of claim 10, wherein (a) said first lug includes a first elongated opening having a first longitudinal axis extending across a first channel of said first lug and (b) said second lug includes a second elongated opening having a second longitudinal axis extending across a second channel of said second lug.

12. The axle alignment system of claim 11, wherein said bolt extends through said first elongated opening, said second elongated opening and an aperture in each original equipment spacer of said two original equipment spacers when said axle alignment system is in said nonadjustable, standard configuration.

13. The axle alignment system of claim 11, wherein said bolt extends through said first elongated opening, said second elongated opening and an eccentric aperture in each adjustable spacer of said two adjustable spacers when said axle alignment system is in said actuated, adjustable configuration.

14. A method of adjusting alignment of an axle of a multi-axle trailer with an axle alignment system including a mounting bracket, a mounting pin, at least one original equipment spacer and at least one adjustable spacer, comprising:
replacing the at least one original equipment spacer that exclusively allows the axle alignment system to assume a nonadjustable, standard configuration with the at least one adjustable spacer that activates the axle alignment system and allows adjustment of the alignment of the axle of the multi-axle trailer.

15. The method of claim 14, including securing said mounting bracket to a frame of the multi-axle trailer.

16. An axle alignment system for a multi-axle trailer, comprising:
a mounting bracket;
a first mounting pin extending through said mounting bracket exclusively in a home position;
an original equipment spacer receiving and holding said first mounting pin exclusively in said home position;
a second mounting pin that replaces said first mounting pin and allows adjustment with respect to said mounting bracket between at least two positions; and
an adjustable spacer that replaces said original equipment spacer and allows adjustment of said second mounting pin between said at least two positions whereby said axle alignment system provides (a) a nonadjustable, standard configuration with said first mounting pin and said original equipment spacer and (b) an activated, adjustable configuration with said second mounting pin and said adjustable spacer allowing one to align an axle on said multi-axle trailer.

17. The axle alignment system of claim 16, wherein said first mounting pin includes a first head and said second mounting pin includes a second head.

18. The axle alignment system of claim 17, wherein said first head and said original equipment spacer have a first identical shape and said second head and said adjustable spacer have a second identical shape wherein said first shape differs from said second shape.

19. The axle alignment system of claim 18, wherein said first shape has four sides and said second shape has more than four sides.

20. The axle alignment system of claim 19, wherein said first mounting pin is a non-eccentric bolt and cooperating nut and said second mounting pin is an eccentric bolt and cooperating nut and said adjustable spacer includes an eccentric aperture.

* * * * *